R. E. STEPHENS.
Gate-Latch.
No. 196,718. Patented Oct. 30, 1877.
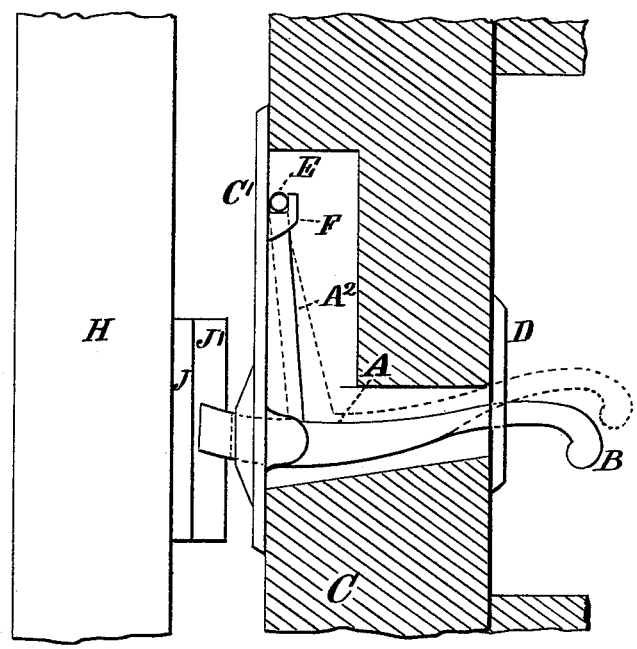
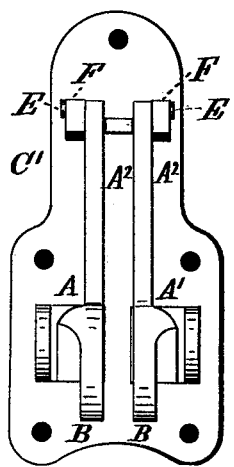
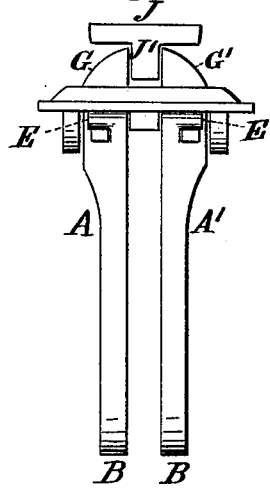
Witnesses.
C. L. Pond.
Wm. S. Grosvenor.
Inventor.
Robert E. Stephens
Per. James Sangster
Atty.

UNITED STATES PATENT OFFICE.

ROBERT E. STEPHENS, OF OWEN SOUND, ONTARIO, CANADA.

IMPROVEMENT IN GATE-LATCHES.

Specification forming part of Letters Patent No. 196,718, dated October 30, 1877; application filed April 16, 1877.

*To all whom it may concern:*

Be it known that I, ROBERT E. STEPHENS, of Owen Sound, in the county of Grey, Province of Ontario, and Dominion of Canada, have invented certain new and useful Improvements in Gate-Latches, which improvements are fully set forth in the following specification and accompanying drawings, in which—

Figure 1 is a side elevation of the latch complete, showing a portion of the gate and post to which it is attached in section. Fig. 2 is a rear view, and Fig. 3 represents a plan or top view, of the latch.

The object of my invention is to produce a latch for fastening a gate that swings both ways, and that can be easily constructed, conveniently operated, and not liable to get out of order; and it consists of two three-armed bars, forming the latches, each provided with a projection or pin, by which it is hung and retained in position, an arm or handle for operating it, and a short arm, forming the bolt or catch, in combination with a ribbed plate, and plates for keeping the parts forming the handle in position, as will be more clearly understood by reference to the drawing, in which—

A A¹ are the two three-armed bars which form the latches. The ends of the rear arms B pass through a mortise in the front bar of the gate C, and through a guide-plate, D, attached to said bar, and are curved downward, as shown in Fig. 1, to serve as handles for unlatching the gate.

The upper arms A² of the bars A pass up through a groove or recess in the forward side of the front bar of the gate, and have outwardly-projecting pins E formed upon their upper ends, to hook upon hooks F, formed upon the upper part of the latch-plate C′, which is secured to the forward side of the front bar of the gate. The ends of the forward arms of bars A are beveled off upon the outer sides, as shown at G G′, so that the forward bar may be pushed by striking against the catch as the gate is swung in either direction, causing the gate to fasten itself.

To the forward latch-post H is attached a plate, J, which is provided with a longitudinal rib, J′, for the forward ends G G′ of the latch-bars A to catch upon.

I claim as my invention—

A gate-latch composed of the bars A A¹, provided with the arms B, beveled catches G G′, upper arms A², having projections or pins E, in combination with the plate D, plate C′, provided with hooks F, and plate J, having rib J′, as and for the purposes specified.

ROBERT E. STEPHENS.

Witnesses:
 JAMES SANGSTER,
 C. L. POND.